(12) United States Patent
Costa Pereira et al.

(10) Patent No.: US 6,199,612 B1
(45) Date of Patent: Mar. 13, 2001

(54) TIRE WITH SIMPLIFIED CROWN REINFORCEMENT

(75) Inventors: Pedro Costa Pereira, Clermont-Ferrand; Jean-Yves Denoueix, Blanzat, both of (FR); Daniel Grier Osborne, Greer, SC (US)

(73) Assignee: Compagnie Générale des Etablisse-ments Michelin-Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/052,846

(22) Filed: Mar. 31, 1998

Related U.S. Application Data
(60) Provisional application No. 60/058,351, filed on Sep. 10, 1997.

(30) Foreign Application Priority Data

Apr. 2, 1997 (FR) .................................................. 97 04247

(51) Int. Cl.⁷ .............................. B60C 9/02; B60C 9/04; B60C 9/18; B60C 9/20; B60C 1/00

(52) U.S. Cl. ........................... 152/532; 152/526; 152/537; 152/548; 152/558; 152/564

(58) Field of Search ..................................... 152/526, 531, 152/532, 537, 548, 558, 559, 560, 564

(56) References Cited

U.S. PATENT DOCUMENTS
3,392,774   7/1968   Le Bosse .

FOREIGN PATENT DOCUMENTS
| 1039382 | 9/1958 | (DE) . |
| 0620129 | 10/1994 | (EP) . |
| 0705717 | 4/1996 | (EP) . |

*Primary Examiner*—Adrienne C. Johnstone
(74) *Attorney, Agent, or Firm*—Baker Botts L.L.P.

(57) ABSTRACT

The tire has a single layer of cushion compound between the cords of the carcass reinforcement that are furthest radially outward in the crown and the cords of the belting that are furthest radially inward in the crown. The single layer of cushion compound may have either a high modulus of elasticity of between 7 and 25 MPa for high crown rigidity or a low modulus of elasticity of less that 6 MPa for reduced hysteresis energy loss.

9 Claims, 1 Drawing Sheet

TIRE WITH SIMPLIFIED CROWN REINFORCEMENT

This application is based on provisional application Ser. No. 60/058,351, filed Sep. 10, 1997.

BACKGROUND OF INVENTION

The invention relates to the crowns of tires and especially to the cushion compounds in contact with the cords that reinforce these crowns.

The crowns of tires usually comprise a carcass reinforcement, belting, usually with at least two reinforcing plies, and a tread. These crowns are in contact with the ground and transmit to the wheels, via the sidewalls and the beads, the transverse forces necessary for steering the vehicles. For the on-road behavior of the vehicles to be satisfactory, it is necessary for the crowns to be very rigid relative, for example, to the sidewalls. An on-going goal is to attempt to obtain this kind of high rigidity simply and in the most economical way possible.

It is well known that the cushion compounds that bind the reinforcing cords of the belting play a part in obtaining a high rigidity. This is why these cushion compounds usually have a high modulus of elasticity. By contrast, the cushion compounds for the carcass cords usually have a low modulus of elasticity because they need to withstand without damage the high amounts of deformation they experience in the sidewalls of the tires.

Furthermore, there is a great deal of research currently being carried out in an attempt to reduce the fuel consumption of road vehicles. To this end, the desire is to design tires which have a very low rolling resistance while keeping the other properties, namely of wear, adherence, behavior, etc. the same, and to do so in the most economical way possible.

SUMMARY OF THE INVENTION

The subject of the invention is a tire in which the crown structure is improved to make it easier to manufacture and thus make it more economical, as well as to improve its quality and performance.

Another subject of the invention is, in a first alternative form, an embodiment of the tire according to the invention designed chiefly to improve the rigidity of the crown and, according to a second alternative form, an embodiment intended chiefly to lower the rolling resistance.

In that which follows, the term "cord" is understood to mean both monofilaments and multifilaments, or assemblies, such as ply cords, twisted cords, or alternatively any kind of equivalent assembly, this being irrespective of the material and treatment of these cords which may, for example, have a surface treatment or be coated or pre-coated with adhesive to encourage them to stick to the rubber.

For a given reinforcing ply, the term "layer of cushion compound" is understood to be the rubber blend in contact with these ply-reinforcing cords, which sticks to these cords and fills the gaps between adjacent cords. In common industrial practice, for a given carcass-reinforcing ply, the same type of cushion compound is used for the various regions of the tire. "Contact" between a cord and a layer of cushion compound is understood to mean that at least some of the external circumference of the cord is in close contact with the rubber blend forming the cushion compound.

The "modulus of elasticity" of a rubber blend is understood to be a secant extension modulus obtained at a deformation in uni-axial extension of the order of 10% at room temperature.

When a rubber blend is stressed sinusoidally, for example for a given deformation $\epsilon^* = \epsilon_0 e^{j\omega t}$, the steady-state response of this blend is itself also sinusoidal and phase-shifted by an angle $\delta$, $\sigma^* = \sigma_0 e^{j(\omega t + \delta)}$. A complex modulus $G^* = \sigma^*/\epsilon^* = \sigma_0 / \epsilon_0 e^{j\delta} = G' + jG''$ is defined, with $\sigma$ representing the stress in MPa. A "dynamic modulus" $G'$ and a "dynamic loss modulus" $G''$ are defined. The ratio $\tan \delta = G''/G'$ is termed the damping factor. Measurements are taken under cyclic shear stress at a frequency of 10 Hz, at a temperature of 60° C. and for a peak-to-peak dynamic deformation of 10%.

The tire according to the invention comprises a tread extended by two sidewalls and two beads, and a carcass reinforcement anchored in the two beads. The tire is composed, in the region under the tread, at least of belting and of the carcass reinforcement. The carcass reinforcement in the region under the tread consists of cords such that:

a) the cords of the carcass reinforcement which are arranged furthest toward the inside of the tire are in contact with a first layer of cushion compound of low modulus of elasticity which is radially on the inside relative to these cords; and b) the cords of the carcass reinforcement which are arranged furthest toward the outside of the tire are in contact with a second layer of cushion compound that is radially on the outside relative to these cords, this second layer of cushion compound also being in contact with the cords of the belting which are arranged radially furthest toward the inside of the tire.

The tire according to the invention has the advantage that under the tread, it has just one layer of cushion compound that is between the carcass reinforcement and the first crown ply of the belting. This makes it possible for the properties and nature of this layer of single cushion compound to be specially chosen to suit the objectives of the tire designer. This also simplifies manufacture as hitherto it was always considered necessary to have a specific cushion compound with which to impregnate the cords of the carcass reinforcement and another specific one for impregnating the cords of the belting.

By way of example, a high modulus of elasticity of between 7 and 25 MPa and preferably between 9 and 15 MPa may be selected for this second layer of single cushion compound.

This gives a crown whose rigidity is very high, giving it excellent strength at high speeds.

In another alternative form, a low modulus of elasticity, of less than 6 MPa and preferably of between 2 and 5 MPa may be selected for this second layer of single cushion compound. This makes it possible to reduce the hysteresis energy expended during running and thus to reduce the resistance to travel of the tire in question.

In a preferred embodiment, a blend with very low hysteresis is selected, for example, one that has a damping factor $\tan \delta$ value of less than 0.08.

DESCRIPTION OF THE DRAWING

The invention is now described by means of the appended drawing in which.

DESCRIPTION OF PREFERRED EMBODIMENTS

Figure 1:
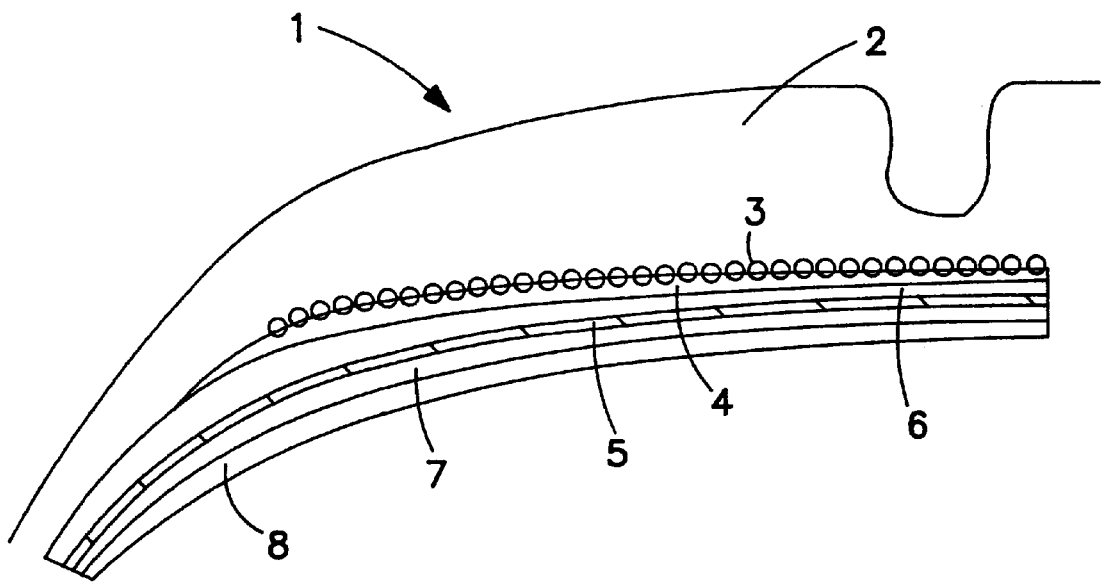
FIG. 1 depicts a partial cross section through the crown of a conventional tire.

Depicted in FIG. 1 in partial cross section is the crown of a conventional tire. This crown 1 comprises a tread 2, cords 3 of a first ply of the belting, a first layer of cushion compound 4 radially on the inside relative to the cords 3, a carcass reinforcement consisting of a circumferential alignment of cords 5 with, in the region under the tread 2, a second layer of cushion compound 6 radially on the outside of the cords 5, a layer of cushion compound 7 which is radially on the inside of the cords 5 and a sealing compound 8 known as the "internal compound" is along the interior wall of the crown 1.

Between the reinforcing cords 3 of the first ply of the belting and the cords 5 of the carcass reinforcement there are two layers 4 and 6 of cushion compound. These two layers usually have very different mechanical properties, the layer 4 having a high modulus of elasticity and the layer 6 having a low modulus of elasticity.

Figure 2:
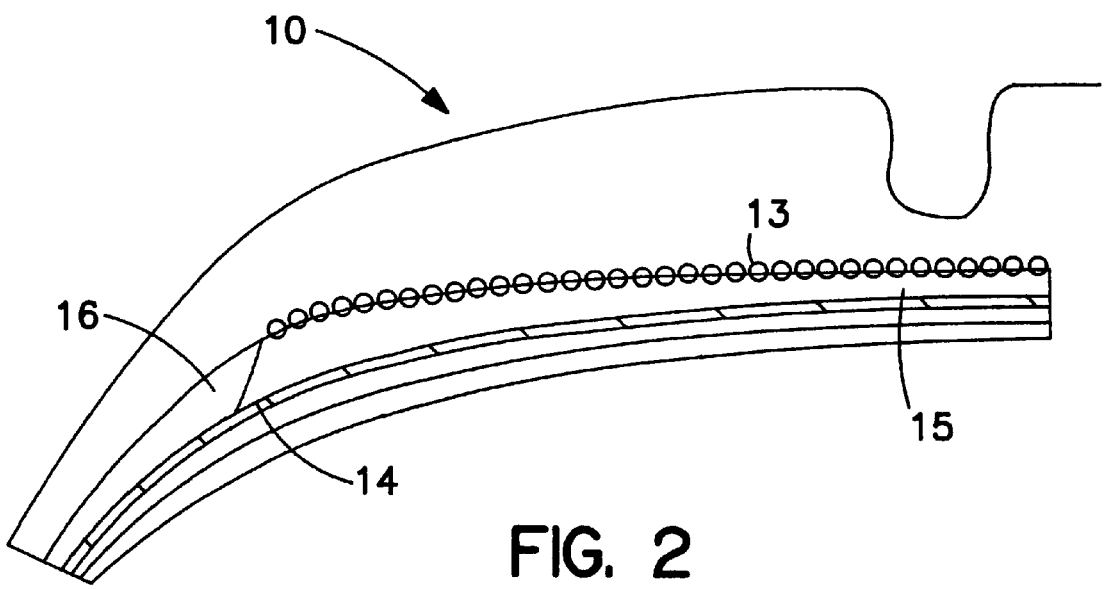
FIG. 2 depicts a partial cross section through the crown of a tire according to the invention.

FIG. 2 depicts in partial cross section the crown 10 of a tire according to the invention. The distinguishing feature of this crown 10 is that there is just a single layer of cushion compound 15 in contact with the cords 13 of the first ply of the belting and with the cords 14 of the carcass reinforcement. Beyond the crown 10, in a sidewall region, the cords 14 of the carcass reinforcement are in contact radially on the outside with another layer of cushion compound 16 of low modulus of elasticity. The separation between the layers 15 and 16 here is exactly at the end of the crown-reinforcing ply. It is, however, possible, as appropriate, for this limit to be offset axially either toward the outside or toward the inside.

This crown structure therefore has the advantage of having one fewer layer of cushion compound, which makes the tire easier to manufacture and reduces its cost.

Some 185/65 R 14 tires were manufactured for testing, with the following configurations:

the crown of the control tire A included two layers 4, 6 of cushion compound between the cords 5 of the carcass reinforcement and the cords 3 of the belting, one layer of cushion compound 6 having a low modulus of elasticity (2.5 MPa) in contact with the cords 5 and one layer of cushion compound 4 having a high modulus of elasticity (13 MPa) in contact with the cords 3 of the belting;

the crown of the tire B had a single layer of cushion compound 15 between the cords 14 of the carcass reinforcement and the cords 13 of the belting, this cushion compound 15 having a high modulus of elasticity (13 MPa);

the tire C was similar to the tire B but the single layer of cushion compound 15 had a low modulus of elasticity (2.5 MPa).

The results of trials demonstrated an improvement of the order of 5% in the longitudinal and transverse rigidity for the tire B relative to the control tire A, as well as better performance in splitting and high-speed strength tests, but by contrast a poor result was obtained in terms of resistance to travel.

The tire C relative to the control displayed a saving of the order of 2% in terms of resistance to travel.

These trials demonstrate the advantage of being able to adjust the rigidity and hysteresis of the layer of a single cushion compound between the carcass reinforcement and the first ply of the belting to suit the objectives of the tire designer.

For producing the various tires according to the invention it is highly advantageous to construct them on a rigid core that dictates the shape of their internal cavity. All the constituent parts of the tire are laid onto this core in the order required by the final design, these components being placed directly in their final position without requiring any shaping at any time in the construction. This construction may, in particular, use the devices described in Patent EP 0 243 851 for the laying of cords for carcass reinforcement and EP 0 264 600 for the laying of rubber compounds. The tire can be molded and vulcanized as explained in U.S. Pat. No. 4,895, 692.

The tires according to the invention may comprise a carcass reinforcement composed of just one circumferential row of cords anchored in the two beads of the tire, in which case the cords of the carcass reinforcement are in contact radially on the outside with the layer of single cushion compound, as has been described. These tires may just as easily comprise a carcass reinforcement composed of a number of circumferential rows of cords anchored in the two beads. In this case of course only the cords of the circumferential row which is radially furthest toward the outside of the tire are in contact with the layer of single cushion compound.

We claim:

1. A tire comprising a tread extended by two sidewalls and two beads, a carcass reinforcement anchored in the two beads, the tire being composed, in the region under the tread, at least of cords of a belting and cords of the carcass reinforcement, wherein, in the region under the tread:
    a) the cords of the carcass reinforcement which are arranged furthest toward the inside of the tire are in contact with a first layer of cushion compound of low modulus of elasticity at 10% extension which is radially on the inside relative to said cords; and
    b) the cords of the carcass reinforcement which are arranged furthest toward the outside of the tire are in contact with a second layer of cushion compound that is radially on the outside relative to said cords, said second layer of cushion compound also being in contact with the cords of the belting which are arranged radially furthest toward the inside of the tire.

2. A tire as claimed in claim 1, wherein the second layer of cushion compound that is radially on the outside relative to said cords of the carcass reinforcement has a high modulus of elasticity at 10% extension.

3. A tire as claimed in claim 2, wherein the compound of high modulus of elasticity at 10% extension is a blend having a modulus of elasticity at 10% extension of between 7 and 25 MPa.

4. A tire as claimed in claim 3, wherein the compound of high modulus of elasticity at 10% extension is a blend having a modulus of elasticity at 10% extension of between 9 and 15 MPa.

5. A tire as claimed in claim 1, wherein the second layer of cushion compound that is radially on the outside relative to said cords of the carcass reinforcement has a low modulus of elasticity at 10% extension.

6. A tire as claimed in claim 5, wherein the first and second layers of cushion compound of low modulus of elasticity at 10% extension have a modulus of elasticity at 10% extension of less than 6 MPa.

7. A tire as claimed in claim 6, wherein the first and second layers of cushion compound of low modulus of elasticity at 10% extension have a modulus of elasticity at 10% extension of between 2 and 5 MPa.

8. A tire as claimed in claim 5, wherein the second layer of cushion compound of low modulus of elasticity at 10% extension has a damping factor tan δ value of less than 0.08 at a frequency of 10 Hz, a temperature of 60° C., and a peak-to-peak dynamic deformation of 10%.

9. A tire as claimed in claim 1, wherein the cords of the carcass reinforcement which are arranged furthest toward the outside of the tire are in contact, in the region of the sidewalls, with another layer of cushion compound that is radially on the outside relative to said cords and has a low modulus of elasticity at 10% extension.

* * * * *

UNITED STATES PATENT AND TRADEMARK OFFICE
CERTIFICATE OF CORRECTION

PATENT NO. : 6,199,612 B1
DATED : March 13, 2001
INVENTOR(S) : Costa Pereira et al.

It is certified that error appears in the above-identified patent and that said Letters Patent is hereby corrected as shown below:

Title page,
Item [73] Assignee, "Etablisse-ments" should read -- Etablissements --

Column 2,
Line 4, "$\sigma^* = \sigma_0 e^{j(\omega+\delta)}$" should read -- $\sigma^* = \sigma_0 e^{j(\omega t+\delta)}$ --
Line 5, "$\sigma_0/\epsilon_0 e^{j\delta}$" should read -- $\sigma_0/\epsilon_0 e^{j\delta}$ --

Signed and Sealed this

Twelfth Day of March, 2002

Attest:

JAMES E. ROGAN
Attesting Officer
Director of the United States Patent and Trademark Office